United States Patent
Lin et al.

(10) Patent No.: US 6,876,778 B2
(45) Date of Patent: Apr. 5, 2005

(54) EDGE ENHANCEMENT METHOD AND APPARATUS IN DIGITAL IMAGE SCALAR-UP CIRCUIT

(75) Inventors: Kun-Wei Lin, Hsinchu (TW); Thomas Chen, Hsinchu (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 583 days.

(21) Appl. No.: 10/093,701

(22) Filed: Mar. 11, 2002

(65) Prior Publication Data

US 2003/0169941 A1 Sep. 11, 2003

(51) Int. Cl.$^7$ ................................................. G06K 9/40
(52) U.S. Cl. ..................... 382/266; 382/252; 382/269; 358/3.26; 358/3.27; 358/463
(58) Field of Search ................................. 382/252, 260, 382/263, 264, 266, 269, 274, 275; 358/1.2, 3.26, 3.27, 463

(56) References Cited

U.S. PATENT DOCUMENTS

| | | | | |
|---|---|---|---|---|
| 4,945,502 A | * | 7/1990 | Kwon et al. ................. | 382/275 |
| 5,687,253 A | * | 11/1997 | Huttenlocher et al. ...... | 382/177 |
| 6,421,468 B1 | * | 7/2002 | Ratnakar et al. ............ | 382/254 |
| 6,807,304 B2 | * | 10/2004 | Loce et al. .................. | 382/209 |

\* cited by examiner

*Primary Examiner*—Bhavesh M. Mehta
*Assistant Examiner*—Yosef Kassa
(74) *Attorney, Agent, or Firm*—Bacon & Thomas PLLC

(57) ABSTRACT

An edge enhancement method and an edge enhancement apparatus in digital image scalar-up circuit are provided. A band-pass filtering process is performed to an input image pixel in multiple directions to generate multiple sum-of-border values which are summed up to generate an overall sum-of-border value. A first gain and a second gain are provided according to the overall sum-of-border value. A high-pass filtering process and a low-pass filtering process are performed to the input image pixel to obtain border and plain components which are multiplied by the first gain and second gain, respectively. The gained border component and plain component are summed and added to the original pixel to obtain a new pixel.

10 Claims, 3 Drawing Sheets

EDGE ENHANCEMENT METHOD AND APPARATUS IN DIGITAL IMAGE SCALAR-UP CIRCUIT

BACKGROUND OF THE INVENTION

1. Field of the Invention

The present invention relates to the technical field of a digital image scalar-up circuit and, more particularly, to an edge enhancement method and an edge enhancement apparatus in digital image scalar-up circuit.

2. Description of Related Art

Typically, the basic method of scaling-up a digital image is to reference the illuminations of neighbor pixels and use, for example, the nearest neighbor, bilinear, quadratic, bi-cubic or look-up table with interpolation methods for generating the new pixels. FIG. 1 shows part pixels of an image, wherein pixels P1~P9 are existed pixels and pixels I1~I8 are new pixels to be generated in scaling up process. The pixels I2 and I3 are in the distance of the pixel P5 as shown by the dashed line. The illuminations of these two new pixels I2 and I3 can be derived from the illuminations of the original pixels P1~P9 in combination with the relative distance (Ix, Iy) from the pixel P5. In the calculating process, the coefficients of the polynomial are determined first according to the illumination information of pixels P1~P9. Then, the illuminations of I2 and I3 are derived from the interpolation method according to the distance (Ix, Iy). In the implementation circuit, the pixels P1, P2 and P3 are in the same line, the pixels P4, P5 and P6 are belonged to the next line, and the pixels P7, P8 and P9 are belonged to the next two lines. Therefore, in order to obtain the information of pixels P1~P9 simultaneously, it needs to implement registers in the circuit that can store information of the two line. Thus, if the original image resolution is 1024×960 (horizontal× vertical), a total number of 1024×2 registers is required.

Although the aforementioned interpolation method can increase the resolution of the image, it also blurs the profile of the image. Therefore, a subsequent edge enhancement process is required to reduce the blurring phenomenon of the image. However, the edge enhancement process also needs extra memory registers, resulting in exhausting the memory resource. Therefore, there is a desire to have a novel design for scaling up digital image with limited memory that can mitigate and/or obviate the aforementioned problems.

SUMMARY OF THE INVENTION

An object of the present invention is to provide an edge enhancement method and an edge enhancement apparatus in digital image scalar-up circuit, which can detect and sharp the profile of the image before scaling up the image, such that the clarity of the image can be maintained after the resolution of the digital image is enlarged.

Another object of the present invention is to provide an edge enhancement method and an edge enhancement apparatus in digital image scalar-up circuit, which can effectively avoid noise so that the noise is not edge-enhanced.

A further object of the present invention is to provide an edge enhancement method and an edge enhancement apparatus in digital image scalar-up circuit, in which the registers used for edge enhancement are the same as those for image scaling-up, thereby reducing the cost of the circuit.

In accordance with one aspect of the present invention, the edge enhancement apparatus in digital image scalar-up circuit of the present invention includes: a buffer for temporarily storing input image pixels to be processed; a profile detecting unit having a directional filter for performing a band-pass filtering to the input image pixel in multiple directions to obtain multiple sum-of-border values for the input image pixel in the directions, an adder for summing up the sum-of-border values to obtain an overall sum-of-border value, and a selector for selecting a first gain and a second gain according to the value of the overall sum-of-border value; and an outline analytic processing unit having a high-pass filter and a low-pass filter for filtering the input image pixel to obtain border component and plain component of the input image pixel, respectively, and a first gain device and a second gain device for multiplying the border component and the plain component by the first gain and the second gain, respectively, which are summed and added to the original pixel for obtaining a new pixel.

In accordance with another aspect of the present invention, the edge enhancement method in digital image scalar-up circuit of the present invention includes the steps of: (A) performing a band-pass filtering process to an input image pixel in multiple directions to generate sum-of-border values in the directions; (B) summing up the sum-of-border values to generate an overall sum-of-border value; (C) providing a first gain and second gain according to the overall sum-of-border value; (D) performing a high-pass filtering process and a low-pass filtering process to the input image pixel to obtain border component and plain component of the input image pixel, respectively; (E) multiplying the border component and the plain component by the first gain and second gain, respectively; and (F) summing the gained border component and plain component and adding the same to the original pixel to obtain a new pixel.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
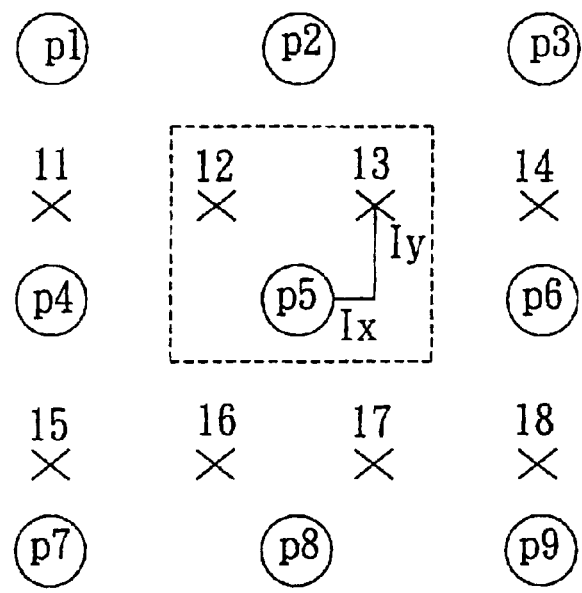
FIG. 1 schematically illustrates an example of using the interpolation method to scale up an image.
Figure 2:
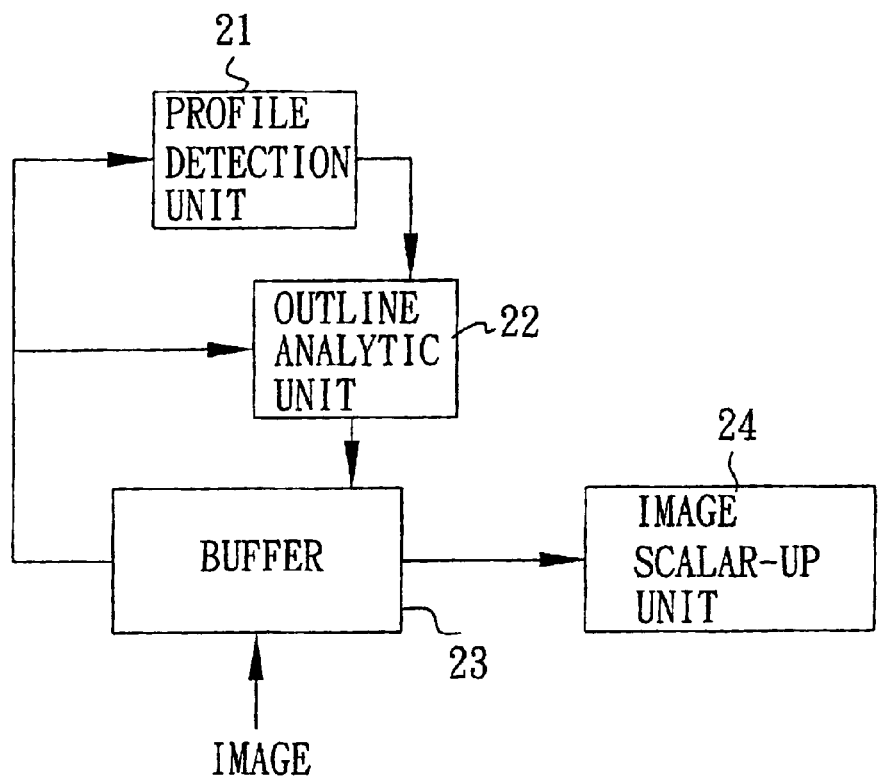
FIG. 2 is the block diagram of an edge enhancement apparatus in digital image scalar-up circuit in accordance with the present invention.
Figure 3:
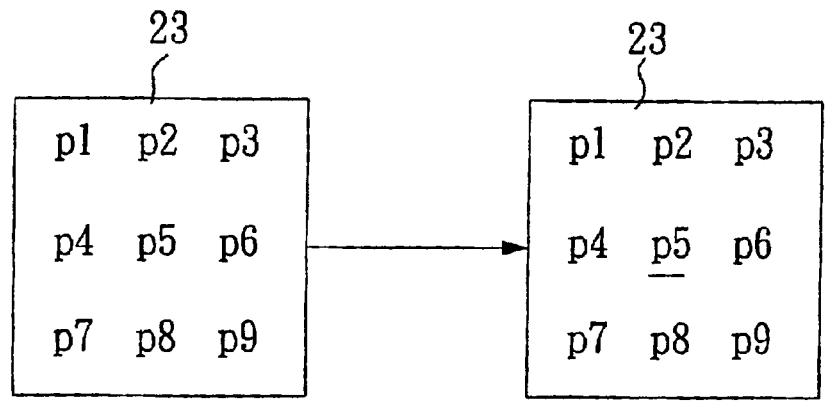
FIG. 3 schematically illustrates the use of an edge enhancement method in digital image scalar-up circuit in accordance with the present invention to perform edge enhancement and flattening processes to input image pixels.

Referring now to FIG. 2, there is illustrated a block diagram of the edge enhancement apparatus in digital image scalar-up circuit in accordance with the prevent invention. As depicted in the figure, before image scalar-up, a profile detection unit 21 and an outline analytic processing unit 22 are provided to perform the edge enhancement and flattening pre-processes on the pixels of the input image. Also with reference to FIG. 3, the pixels of the input image to be processed are first stored in a buffer 23. For example, the buffer 23 is originally stored with pixels P1~P9, and after edge enhancement and flattening preprocesses, the illumination information of pixel P5 is replaced and denoted as P5. Then, the image pixels are applied to the image scalar-up unit 24 for increasing the resolution.

Figure 4:
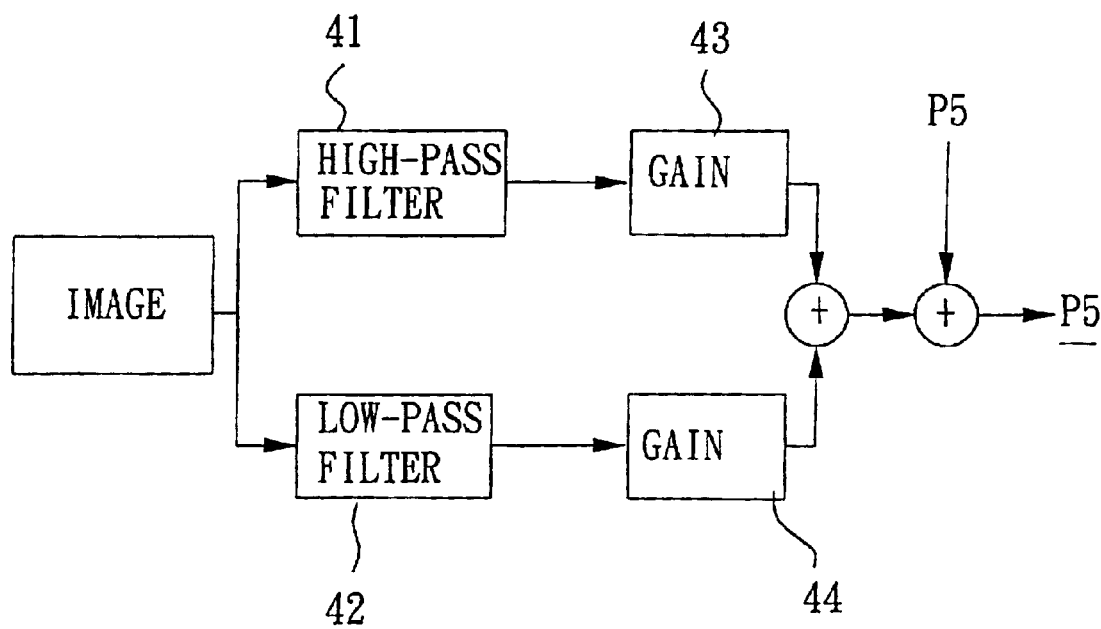
FIG. 4 is the block diagram of an outline analytic processing unit in accordance with the present invention.

FIG. 4 schematically illustrates the architecture of the outline analytic processing unit 22, which includes a high-pass filter and a low-pass filter for filtering the image pixel P5. Because the high-pass filter 41 only allows the high-frequency components, such as the border component of an image, to pass therethrough, the use of the high-pass filter 41 can obtain the border component of the input image pixel P5. On the contrary, because the low-pass filter 42 only allows the low-frequency components of an image to pass therethrough, the use of the low-pass filter 42 can obtain the plain component of the input image pixel P5. The border component is further processed by a first gain device 43 for being multiplied by a first gain, and the plain component is further processed by a second gain device 44 for being multiplied by a second gain. Next, the gained border component and plain component are summed and added to the original pixel P5 to obtain an edge-enhanced and flattened new pixel P5.

Figure 5:
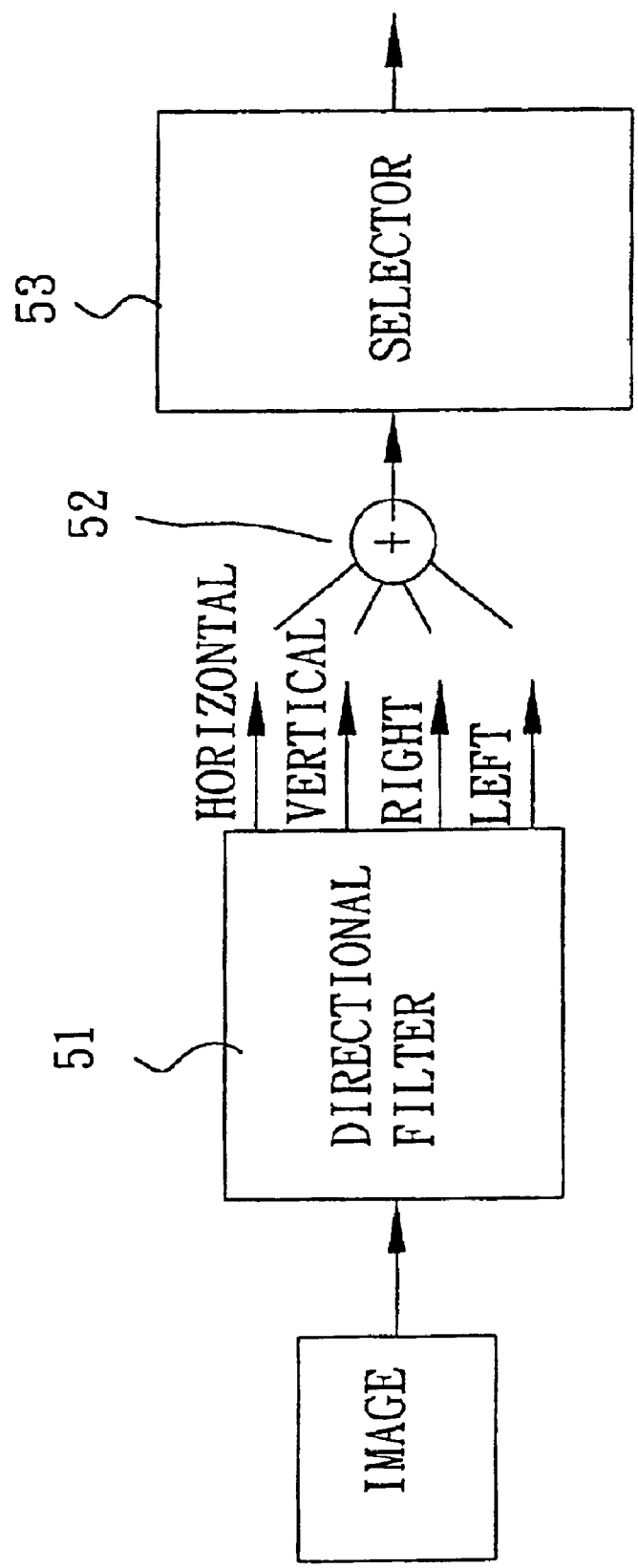
FIG. 5 is the block diagram of the profile detection unit in accordance with the present invention.

The gain values of the gain devices 43 and 44 in the outline analytic processing unit 22 are determined by the profile detection unit 21. As shown in FIG. 5, the profile detection unit 21 includes a directional filter 51, an adder 52 and a selector 53. The directional filter 51 is provided to perform a band-pass filtering to the input image in a plurality of directions, for example, in horizontal, vertical, right slanting and left slanting directions, so as to obtain four sum-of-border values (SOB 1~4) for the input image pixels in the horizontal, vertical, left slanting and right slanting directions, wherein the left slanting direction is preferred to has a 45-degree angle and the right slanting direction is preferred to has a 135-degree angle with respect to the horizontal line. The adder 52 sums up the aforementioned four SOB 1~4 to obtain an overall sum of border, denoted as SOB. A large value of SOB indicates that the image pixel P5 is likely to be the profile component, and a small value of SOB means that the image pixel P5 is likely to be a part of the plain component.

The selector 53 selects values for the first gain and second gain according to the value of the SOB. A large value of SOB implies that the image pixel P5 is likely to be a profile component, and therefore the selector provides a large first gain and a small second gain to enhance the edge portion and attenuate plain component of the image, thereby edge-enhancing the profile of the image. On the contrary, a small value of SOB implies that the image pixel P5 is likely to be the plain component or noise which is not required to be edge-enhanced, and therefore the selector provides a small first gain and a large second gain to smooth the image and remove noise. In implementation, the selector is provided with multiple pre-determined threshold values TH1~THn to define multiple threshold ranges, each corresponding to a first gain and a second gain, for being compared with the value of SOB. By determining the threshold range where the SOB is in, the corresponding pre-determined first gain and second gain are determined, so that the value of the provided first gain is direct proportional to the value of SOB, and the value of the provided second gain is inverse proportional to the value of SOB.

With reference to FIG. 2 and FIG. 3 again, after the image pixels in the buffer 23 have been edge-enhanced and flattened by the profile detection unit 21 and outline analytic processing unit 22, the image pixels are still kept in the buffer 23, so that the image scalar-up unit 24 can use, for example, the inter-interpolation method to increase the resolution of the image. In such a scalar-up process, the buffer 23 is still used to temporarily store the image pixels, and thus there is no need to provide additional memory.

In view of the foregoing, it is known that the present invention can detect the profile of image and selectively edge-enhance the detected portion before the image scalar-up process. Thus, when the image scalar-up process is performed, the blurs of the profile can be effectively reduced, and in the same time, the noise in the image is not enhanced. Therefore, as the resolution of the digital image is amplified, the clarity of image can be maintained. In addition, the buffer used by the profile detecting unit and the outline analytic processing unit to perform the edge enhancement and flattening processes for the input image pixels is identical to the buffer used in the image scalar-up process. Therefore, in comparison with the conventional image scalar-up and edge enhancement processes that require different buffers, the present invention can reduce the memory capacity to be used by sharing memory, thereby greatly reducing the circuit cost.

Although the present invention has been explained in relation to its preferred embodiment, it is to be understood that many other possible modifications and variations can be made without departing from the spirit and scope of the invention as hereinafter claimed.

What is claimed is:

1. An edge enhancement apparatus in digital image scalar-up circuit, comprising:

a buffer for temporarily storing input image pixels to be processed;

a profile detecting unit including:

a directional filter for performing a band-pass filtering to the input image pixel in multiple directions to obtain multiple sum-of-border values for the input image pixel in the directions;

an adder for summing up the sum-of-border values to obtain an overall sum-of-border value; and a selector for selecting a first gain and a second gain according to the value of the overall sum-of-border value; and an outline analytic processing unit including:

a high-pass filter and a low-pass filter for filtering the input image pixel to obtain border component and plain component of the input image pixel, respectively; and a first gain device and a second gain device for multiplying the border component and the plain component by the first gain and the second gain, respectively, which are summed and added to the original pixel for obtaining a new pixel.

2. The apparatus as claimed in claim 1, wherein the first gain is direct proportional to the overall sum-of-border value, and the second gain is inverse proportional to the overall sum-of-border value.

3. The apparatus as claimed in claim 2, wherein the selector is provided with multiple pre-determined threshold values to define multiple threshold ranges, each corresponding to a first gain and a second gain, for being compared with the overall sum-of-border value, so as to determine corresponding pre-determined first gain and second gain based on the threshold range where the overall sum-of-border value is in.

4. The apparatus as claimed in claim 1, wherein the directional filter of the profile detection unit performs a band-pass filtering for the input image pixel in horizontal, vertical, right slanting and left slanting directions to obtain sum-of-border values for the input image pixel in the horizontal, vertical, left slanting and right slanting directions.

5. The apparatus as claimed in claim 1, wherein new pixel that has been edge-enhanced is stored in the buffer for performing an image scalar-up process by still using the buffer.

6. An edge enhancement method in digital image scalar-up circuit, comprising the steps of:

(A) performing a band-pass filtering process to an input image pixel in multiple directions to generate sum-of-border values in the directions;

(B) summing up the sum-of-border values to generate an overall sum-of-border value;

(C) providing a first gain and second gain according to the overall sum-of-border value;

(D) performing a high-pass filtering process and a low-pass filtering process to the input image pixel to obtain border component and plain component of the input image pixel, respectively;

(E) multiplying the border component and the plain component by the first gain and second gain, respectively; and (F) summing the gained border component and plain component and adding the same to the original pixel to obtain a new pixel.

7. The method as claimed in claim 6, wherein in step (C), the first gain is direct proportional to the overall sum-of-border value, and the second gain is inverse proportional to the overall sum-of-border value.

8. The method as claimed in claim 7, wherein the step (A) performs a band-pass filtering for the input image pixel in horizontal, vertical, right slanting and left slanting directions to obtain sum-of-border values for the input image pixel in the horizontal, vertical, left slanting and right slanting directions.

9. The method as claimed in claim 6, wherein in step (A), the input image pixel is temporarily stored in a buffer.

10. The method as claimed in claim 9, wherein the new pixel obtained in step (F) is temporarily stored in the buffer for performing an image scalar-up process by still using the buffer.

* * * * *